United States Patent
Brassil et al.

(10) Patent No.: US 7,212,785 B2
(45) Date of Patent: May 1, 2007

(54) LOCAL FILE TRANSFER

(75) Inventors: John Brassil, Los Gatos, CA (US); James Thomas Edward McDonnell, Bristol (GB); Peter J. Macer, Bristol (GB); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 09/875,266

(22) Filed: Jun. 7, 2001

(65) Prior Publication Data

US 2002/0187776 A1    Dec. 12, 2002

(51) Int. Cl.
*H04B 7/00* (2006.01)

(52) U.S. Cl. ............... 455/41.2; 455/414.1; 455/553.1; 455/517; 705/18; 380/258; 365/189.05; 709/206

(58) Field of Classification Search ............... 455/406, 455/414.1, 417, 418, 419, 420, 456.2–456.3, 455/466, 41.2, 41.3, 426.1–426.2, 552.1, 455/553.1, 404.1, 445, 435.1, 410, 517; 235/462.45; 705/18, 26; 380/258; 365/189.05; 709/206
See application file for complete search history.

(56) References Cited

U.S. PATENT DOCUMENTS

| | | | |
|---|---|---|---|
| 5,479,156 A * | 12/1995 | Jones ....................... 340/5.64 |
| 5,742,915 A * | 4/1998 | Stafford ................... 455/456.1 |
| 6,438,585 B2 * | 8/2002 | Mousseau et al. .......... 709/206 |
| 6,549,625 B1 * | 4/2003 | Rautila et al. .............. 380/258 |
| 6,594,484 B1 * | 7/2003 | Hitchings, Jr. ............ 455/414.1 |
| 6,625,580 B1 * | 9/2003 | Tayama ....................... 705/26 |
| 6,650,871 B1 * | 11/2003 | Cannon et al. ............. 455/41.2 |
| 6,694,359 B1 * | 2/2004 | Morris et al. ............... 709/219 |
| 6,871,063 B1 * | 3/2005 | Schiffer ....................... 455/410 |
| 6,885,869 B2 * | 4/2005 | Raith ........................ 455/456.6 |
| 6,950,668 B2 * | 9/2005 | Brassil et al. ............... 455/517 |
| 2001/0044747 A1 * | 11/2001 | Ramachandran et al. ..... 705/16 |
| 2002/0000470 A1 * | 1/2002 | Lanzaro et al. ........ 235/462.45 |
| 2002/0028674 A1 * | 3/2002 | Slettengren et al. ......... 455/422 |
| 2002/0143634 A1 * | 10/2002 | Kumar et al. ................. 705/18 |
| 2003/0114135 A1 * | 6/2003 | Lorbeck ..................... 455/403 |
| 2005/0162939 A1 * | 7/2005 | Suzuki et al. .......... 365/189.05 |

FOREIGN PATENT DOCUMENTS

EP    1489682 A1 * 12/2004

* cited by examiner

*Primary Examiner*—Fan Tsang
*Assistant Examiner*—Md S A Elahee

(57) ABSTRACT

A method is disclosed of transferring data to a first communications device having a first transceiver for communication at a first data rate over a long range, and a second transceiver for communication at a second, higher data rate over a short range. The method includes forming a co-ordinated short-range wireless network using the first communications device and at least one second communications device of a similar type. Communication is then initiated between the first communications device and said at least one second communications device to establish whether that second communications device has data required by the first communications device. The first communications device then communicates, upon the first communications device receiving confirmation that a second communications device has the required data, with a service provider using its first transceiver to request permission for the transfer of the required data from said communications device to the first communications device. Finally, the required data is transferred from said second communications device to the first communications device, following transmission by the service provider to the first communications device of authorisation.

14 Claims, 1 Drawing Sheet

LOCAL FILE TRANSFER

BACKGROUND OF THE INVENTION

This invention relates to a local file transfer system and method, and in particular to a system and method for transferring digital data over a high-speed, short-range communications link with the assistance of a slow speed, wide area network communications link.

It is anticipated that hand-held portable and mobile devices (such as mobile phones, laptop computers and personal digital assistants (PDAs)) will have multiple communications interfaces, including a short-range, high-speed wireless network interface and a slower-speed, wide area network interface. Thus, such a device may have a short-range, high-speed Bluetooth interface, and a slower-speed cellular telephone interface. Bluetooth is a short-range wireless technology which operates at 2.45 GHz. Such a short-range wireless network (known as a short-range wireless network) can support up to eight simultaneous devices. The membership of such a piconet can dynamically change as users enter and leave.

Another known short-range wireless technology is the wireless networking protocol IEEE802.11.

With either of these two short-range wireless technologies, each member of a short-range wireless network usually communicates outside the network at no more than the data transmission rate of a single wide area connection such as a cellular telephony connection. Typically, each device in such a short-range wireless network is capable of storing a limited amount of digital data.

SUMMARY OF THE INVENTION

The present invention provides a method of transferring data to a first communications device having a first transceiver for communication at a first data rate over a long range, and a second transceiver for communication at a second, higher data rate over a short range, the method comprising the steps of:
  a) forming a coordinated short-range wireless network using the first communications device and at least one second communications device of a similar type;
  b) initiating communication between the first communications device and said at least one second communications device to establish whether or not said at least one second communications device has data required by the first communications device;
  c) the first communications device communicating, upon the first communications device receiving confirmation that a second communications device has the required data, with a service provider using its first transceiver to request permission for the transfer of the required data from said second communications device to the first communications device; and
  d) transferring the required data from said second communications device to the first communications device following transmission by the service provider to the first communications device of authorisation.

Advantageously, prior to step d), the service provider transmits provisional permission, together with a costing, to the first transceiver of the first communications device.

Preferably, the method further comprises the step of the first communications device transmitting a message accepting the costing to the service provider using its first transceiver. In this case, the service provider may issue an authorisation once acceptance of the costing has been received from the first communications device, and may communicate said costing to a network service provider of the first communications device.

Conveniently, the second transceiver of the first communications device communicates, once the authorisation has been received, with said second communications device to inform that device that authorisation has been received and to request downloading of the required data.

In a preferred embodiment an mp3 file constitutes the required data. Preferably, the method further comprises an initial step of inputting a list of required data files into a memory provided in the first communications device. In this case, during step b), the list of required data files is communicated by the second transceiver of the first communications device to said at least one second communications device within the short-range wireless network.

The invention also provides a method of purchasing goods using a first communications device having a first transceiver for communication at a first data rate over a long range, and a second transceiver for communication at a second, higher data rate over a short range, the method comprising the steps of:
  a) inputting details of an intended purchase into a memory provided in the first communications device;
  b) transmitting details of said intended purchase, using the second transceiver of the first communications device, to any similar, in-range transceiver which communicates at the second, higher data rate over a short range, any such similar transceiver being associated with a respective supplier;
  c) receiving, at the second transceiver of the first communications device, a communication from any such similar transceiver indicating that said intended purchase is available and indicating its cost;
  d) the first communications device communicating, upon receiving said communication from said supplier, with a payment facility using its first transceiver; and
  e) the first communications device placing an order for said intended purchase with said supplier using its second transceiver when payment authorisation is received from the payment facility.

Preferably, the method further comprises the step of the payment facility communicating the cost of said intended purchase to a banking facility associated with the user of the first communications device upon the first communications device communicating to the payment facility that said order has been made.

The invention further provides a communications device having a first transceiver for communication at a first data rate over a long range, a second transceiver for communication at a second, higher data rate over a short range, an mp3 player, a memory, and a processor for controlling downloading of mp3 files to the memory, and for transferring mp2 files from the memory to the mp3 player.

Advantageously, the processor is programmed to control the second transceiver to request downloading of a given mp3 file from a similar communications device within the range of the second transceiver. Preferably, the processor is programmed to control the first transceiver to request permission from a service provider to download said given mp3 file from a similar communications device holding said mp3 file in its memory. The processor may also be programmed to control the second transceiver to request downloading of said mp3 file once authorisation is received from the service provider.

BRIEF DESCRIPTION OF THE DRAWINGS

The invention will now be described in greater detail, by way of example, with reference to the drawings in which.

DESCRIPTION OF PREFERRED EMBODIMENTS

Figure 1:
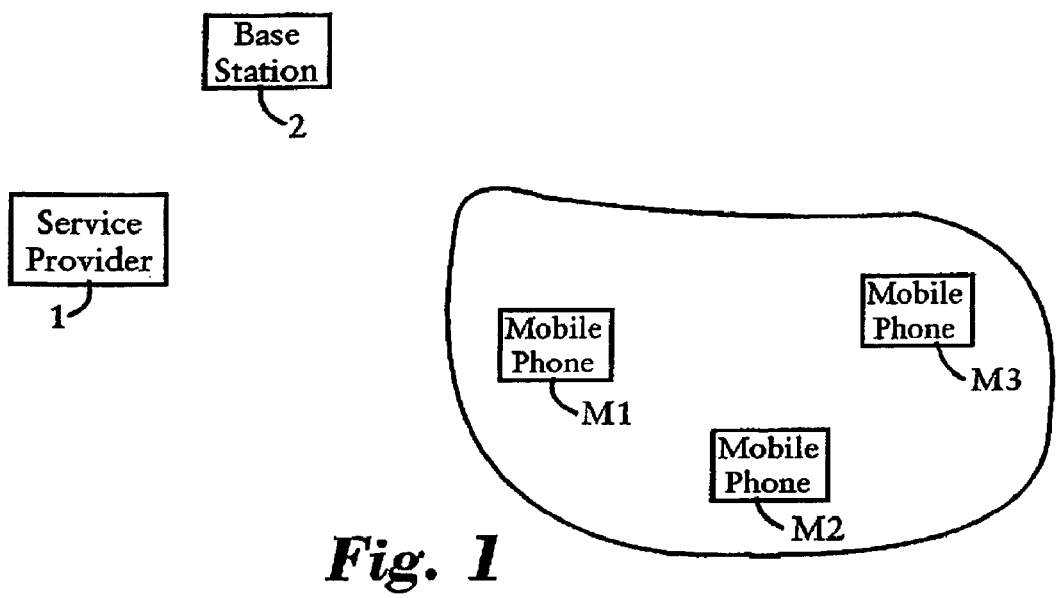
FIG. 1 is a schematic representation of a short-range wireless network and an associated service provider.

Referring to the drawings, FIG.1 shows a short-range wireless network which supports three mobile phones M1 M2 and M3. The invention allows the mobile phones M1 to M3 to advertise to find and rapidly exchange sharable digital content using a service provider 1 and a base station 2 of a cellular mobile telecommunications network.

Figure 2:
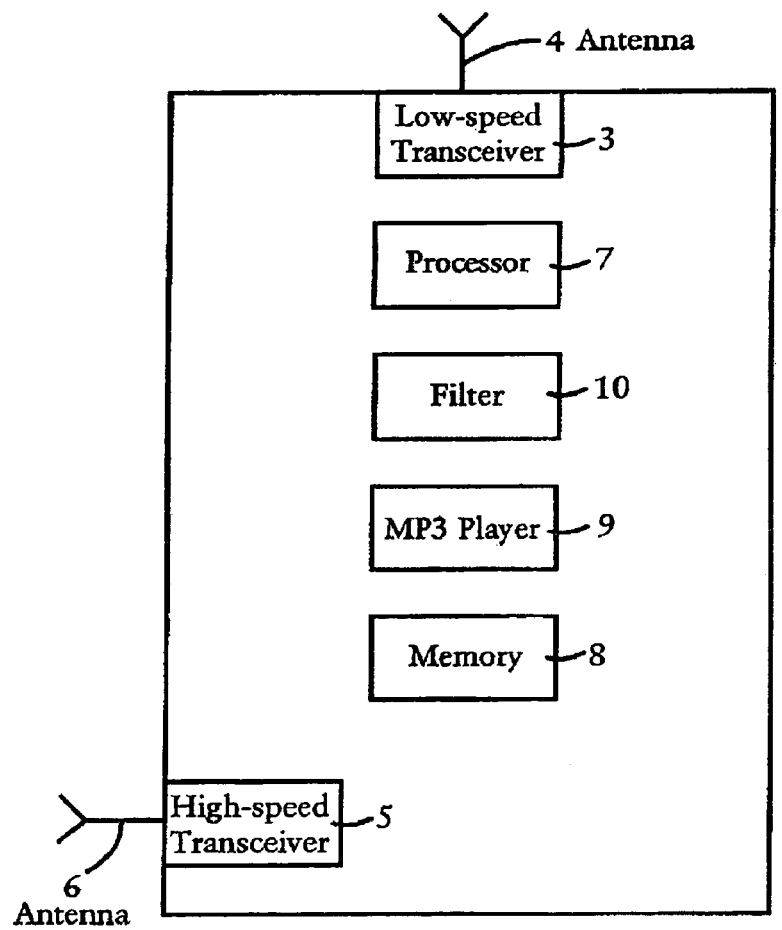
FIG. 2 is a schematic representation of a mobile phone of the network of FIG. 1.

FIG. 2 shows schematically the mobile phone M1, the other mobile phones M2 and M3 being similar. The device M1 includes a low-speed transceiver 3 (typically 100 to 300 kilobits/sec) for communication with the base station 2 via an antenna 4. The mobile phone M1 also includes a high-speed transceiver 5 (typically 1 to 54 megabits/sec) and an antenna 6 for communication with the mobile phones M2 and M3 (and with any other mobile phone which enters the short-range wireless network). The short-range wireless network uses the wireless networking technology IEEE802.11, and so can accommodate a large number of users. Alternatively, the short-range wireless network uses the Bluetooth wireless networking technology.

The mobile phone also includes a processor 7 a memory 8, an mp3 player 9 and a filter 10. The memory 8 is rated at 5 megabits, and so is capable of storing an average length mp3 music file.

As an illustration of the invention, assume that the user of the integrated mobile phone MP3 player M1 boards a bus, and immediately joins a short-range wireless network of fellow commuters, this short-range wireless network being typified by that shown in FIG. 1. The user of the mobile phone M1 then transmits a request for the download of mp3 files from the two other members M2 and M3 of the short-range wireless network. This request is made using the processor 7, the filter 10, the transceiver 5 and the antenna 6 of the mobile phone M1. The filter 10 is a list of items of interest to the user of the mobile phone M1, and is input to that mobile phone either by downloading a list of preferences from the user's PC, or by inputting directly using the keypad (not shown) of the mobile phone. For example, the filter 10 could specify mp3 files by any of any of a given number of different artists.

Assuming that one of the other members of the short-range wireless network, say the mobile phone M2, has one or more mp3 files of interest to the user of the mobile phone M1, information to this effect is transmitted to the mobile phone M1 by the mobile phone M2. The mobile phone M1 then transmits a request to use an mp3 file of interest to the service provider 1 via the base station 2 using its low-speed transceiver 3 and antenna 4. In this case, the service provider 1 is a music service provider. The service provider 1 will then transmit permission to use the mp3 file, together with the cost for this use, to the transceiver 3 of the mobile phone M1 via by the base station 2.

The user of the mobile phone M1 then decides whether to accept the cost for this use, and transmits this decision to the service provider 1, via the base station 2, using its slow-speed transceiver 3 and antenna 4. The service provider 1 then transmits a token or password, allowing the transaction to take place, to the mobile phone M1 via the base station 2. At the same time, the service provider 1 transmits information regarding the cost to the network service provider of the mobile phone M1, so that the user of that mobile phone can be billed.

The mobile phone M1 then communicates with the mobile phone M2 using its high-speed, short-range transceiver 5 and antenna 6 to confirm that the mobile phone M1 has access rights to the mp3 file of interest. The mobile phone M2 then downloads this mp3 file to the mobile phone M1 over the high-speed, short-range link. This mp3file is then stored in the memory 8 of the mobile phone M1, ready for playing on the mp3 player of that mobile phone.

Most of the transaction steps described above could be automatic, so that the user of the mobile phone M1 need only notice that a new mp3 file has been stored in the memory 8 of the phone prior to using that file. Thus, the mobile phone M1 may be programmed, using its processor 7, automatically to request the download of mp3 files of interest whenever it enters a short-range wireless network. Similarly, other mobile phones in the short-range wireless network may be programmed to respond either positively or negatively to a request for mp3 files to be downloaded. Each of these mobile phones could also be programmed to carry out all the other necessary steps of the transaction process. It would, of course, be possible for each of the steps to be individually controllable by the users of the mobile phones.

The transaction process described above could be modified, for example, by arranging for the user of the mobile phone M2 to receive a payment from the user of the mobile phone M1. In this case, the service provider 1 could arrange for the network service provider of the mobile phone M2, to credit that user's account, once confirmation that the download has been completed is received by the service provider 1. This confirmation could be sent by either the mobile phone Ml or the mobile phone M2 over the slow-speed cellular network.

The transaction process described above could also be modified by arranging for the transaction process to be initiated by the user of the mobile phone M1 advertising that mp3 files are available for download to other members of a short-range wireless network. In this case, the transaction process would commence with the mobile phone M1 transmitting a list of available mp3 files over the short-range, high-speed network. Assuming one of the other members of that network, say the mobile phone M2, wishes to download one of the available mp3 files, that mobile phone will transmit a request to use a mp3 file of interest to the service provider 1 via the base station 2, using its low-speed transceiver 3 and antenna 4. The remaining steps of the transaction will then be substantially identical to that described above, but with references to the mobile phone M1 and M2 reversed. Thus, the mobile phone M2 will eventually be permitted to download an mp3 file of interest, and its network service provider will be informed of the cost of the transaction, and possibly a payment will be made to the user of the mobile phone M1 via its network service provider.

The transaction process described above could be further modified to create a new form of limited duration digital right (that is to say a right to use). Thus, the right to use a given digital content such as an audio file can be limited to temporary use while the device (such as a mobile phone) requesting the right is associated with the short-range wireless network from which the digital content is obtained. In this case, the digital content would be transferred by streaming, rather than by downloading an entire file, so that the audio file would be heard in real time by the user of the receiving mobile phone. Here again, the transaction process would include the use of the low-speed transceiver 3 and associated antenna 4 to obtain permission to use the audio file from a service provider.

It will be apparent that the method of the invention could be modified for other purposes. For example, if the user of the mobile phone M1 wishes to purchase a specific item, details of this item can be included in the list of items of interest in the filter 10. Then, if the user of the mobile phone M1 is in a shopping mall, the short-range high-speed transceiver 5 of that phone can be used to interrogate similar transceivers in the shops of the mall as they are passed. If one of the shops has the item of interest, it will transmit confirmation of this, together with the asking price, over the short-range network. The user of the mobile phone M1 can then order the item using the high-speed, short-range network, and can arrange for payment, for example by credit card over a secure channel, using the low-speed, long-range cellular network. The user can confirm the order with the shop over the short-range network. The short-range network could also be used to arrange for delivery of the item, or for the item to be held until the user wants to pick it up.

The invention claimed is:

1. A method of transferring data to a first communications device having a first transceiver for communication at a first data rate over a long range, and a second transceiver for communication at a second, higher data rate over a short range, the method being performed by using a coordinated short-range wireless network including the first communications device and at least one second communications device of a similar type, the method comprising the steps of:
   (a) initiating communication between the first communications device and said at least one second communications device to establish whether or not said at least one second communications device has data required by the first communications device;
   (b) the first communications device communicating, upon the first communications device receiving confirmation that a second communications device has the required data, with a service provider using its first transceiver to request permission for the transfer of the required data from said second communications device to the first communications device; and
   (c) transferring the required data from said second communications device to the first communications device following transmission by the service provider to the first communications device of authorisation.

2. A method as claimed in claim 1, wherein, prior to step (c), the service provider transmits provisional permission, together with a costing, to the first transceiver of the first communications device.

3. A method as claimed in claim 2, further comprising the step of the first communications device transmitting a message accepting the costing to the service provider using its first transceiver.

4. A method as claimed in claim 3, further comprising the step of the service provider issuing an authorisation once acceptance of the costing has been received from the first communications device.

5. A method as claimed in claim 4, further comprising the step of the service provider communicating said costing to a network service provider of the first communications device.

6. A method as claimed in claim 4, wherein the second transceiver of the first communications device communicates, once the authorisation has been received, with said second communications device to inform that device that authorisation has been received and to request downloading of the required data.

7. A method as claimed in claim 1, wherein an mp3 file constitutes the required data.

8. A method as claimed in claim 1, further comprising an initial step of inputting a list of required data files into a memory provided in the first communications device.

9. A method as claimed in claim 8, wherein, during step (a), the list of required data files is communicated by the second transceiver of the first communications device to said at least one second communications device within the short-range wireless network.

10. The method of claim 1, further including:
    transferring data to one of the at least one second communications device, said second communications device having a first transceiver for communication at the first data rate over a long range, and a second transceiver for communication at the second, higher data rate over a short range;
    initiating communication between the second communications device and the first communications device to establish whether or not said first communications device has data required by the second communications device, the second communications device communicating, upon the second communications device receiving confirmation that the first communications device has the required data, with the service provider using its first transceiver to request permission for the transfer of the required data from said first communications device to the second communications device; and
    transferring the required data from said first communications device to the second communications device following transmission by the service provider to the second communications device of authorisation.

11. A communications device having a first transceiver for communication at a first data rate over a long range, a second transceiver for communication at a second, higher data rate over a short range, a music player, a memory, and a processor for controlling downloading of music files to the memory, and for transferring music files from the memory to the music player, the processor being programmed to control the second transceiver to request downloading of a given music file at the second data rate from a similar communications device within the range of the second transceiver, and to control the first transceiver to request permission from a service provider to download said given music file from a similar communication device holding said music file in its memory.

12. A communications device as claimed in claim 11, wherein the processor is programmed to control the second transceiver to request downloading of said music file once authorisation is received from the service provider.

13. A communications device as claimed in claim 11, further including a filter for enabling only certain music files from the similar communications device to be downloaded from the second transceiver into the memory.

14. A method of transferring data to a first communications device having a first transceiver for wireless communication at a first data rate over a long-range link, and a second transceiver for wireless communication at a second, higher data rate over a short-range link, the method being performed by using a coordinated short-range wireless network including the first transceiver of the first communications device and a short-range transceiver of the second communications device, the short-range transceiver of a second communications device being arranged for wireless communication at the second, higher data rate, the method comprising the steps of:

(a) initiating communication between the second transceiver of the first communications device and the short-range transceiver of the second communications device, (b) establishing whether said second communications device has data required by the first communications device as a result of the initial communication, the first communications device transmitting via the long-range link, upon the first communications device receiving confirmation that the second communications device has the required data, with a service provider using the first transceiver to request permission for transfer of the required data from said second communications device to the first communications device; and (c) transferring the required data from said second communications device to the first communications device via the short-range link between the second transceiver of the first device and the transceiver of the second device, the transfer occurring following transmission, via the long-range link, by the service provider to the first communications device of authorisation.

* * * * *